United States Patent [19]

Eiting

[11] Patent Number: 4,667,550

[45] Date of Patent: May 26, 1987

[54] PRECISION SLITTING APPARATUS AND METHOD

[75] Inventor: John C. Eiting, Minster, Ohio

[73] Assignee: Precision Strip Technology, Inc., Minster, Ohio

[21] Appl. No.: 813,663

[22] Filed: Dec. 26, 1985

[51] Int. Cl.⁴ ............................................. B23D 19/06
[52] U.S. Cl. ........................................... 83/56; 83/72; 83/74; 83/503; 83/504
[58] Field of Search ..................... 83/74, 72, 73, 504, 83/503, 507, 499, 56

[56] References Cited

U.S. PATENT DOCUMENTS

| | | | |
|---|---|---|---|
| 3,107,589 | 10/1963 | Goettsch et al. | 83/74 X |
| 3,257,887 | 6/1966 | Jones | 83/503 |
| 3,364,803 | 1/1968 | Senftleben | 83/503 |
| 4,330,092 | 5/1982 | Roman | 83/501 X |
| 4,470,331 | 9/1984 | Eiting et al. | 83/333 |
| 4,508,282 | 4/1985 | Eiting et al. | 242/56.2 |
| 4,541,163 | 9/1985 | Eiting et al. | 29/426.5 |
| 4,548,105 | 10/1985 | Koutonen | 83/74 |

*Primary Examiner*—James M. Meister
*Attorney, Agent, or Firm*—Wood, Herron & Evans

[57] ABSTRACT

A slitting machine of the type having a pair of spaced, parallel arbors and at least one pair of mating rotary knives, each arbor carrying one mate of each pair of rotary knives, each rotary knife being positioned in a desired axial relationship with its mate on the other arbor, this desired relationship being maintained by manual or automatic control of the relative positions of the arbors by rotatably mounting at least one end of at least one arbor in a slideable sleeve which may be cam driven in both axial directions. Axial backlash is reduced by maintaining the arbors in compression with a spring loaded tailstock.

30 Claims, 4 Drawing Figures

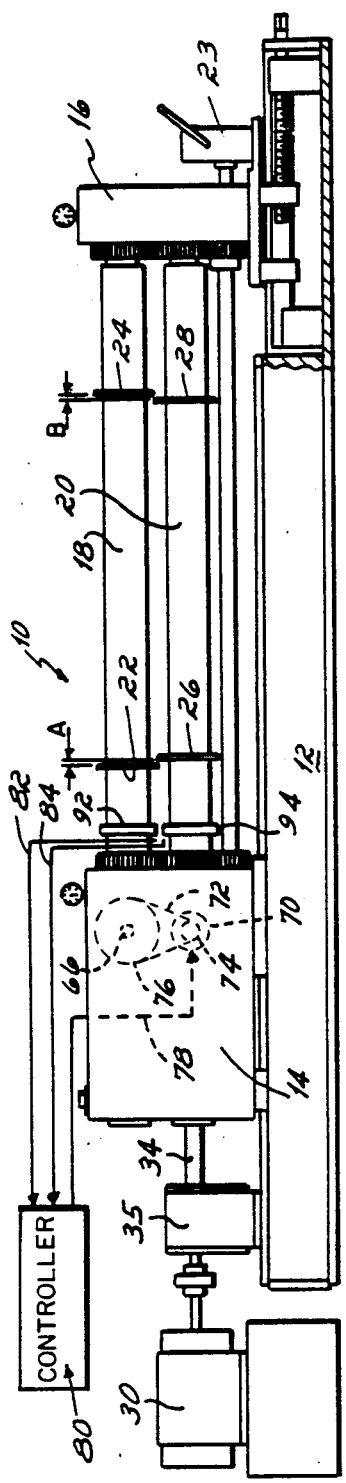
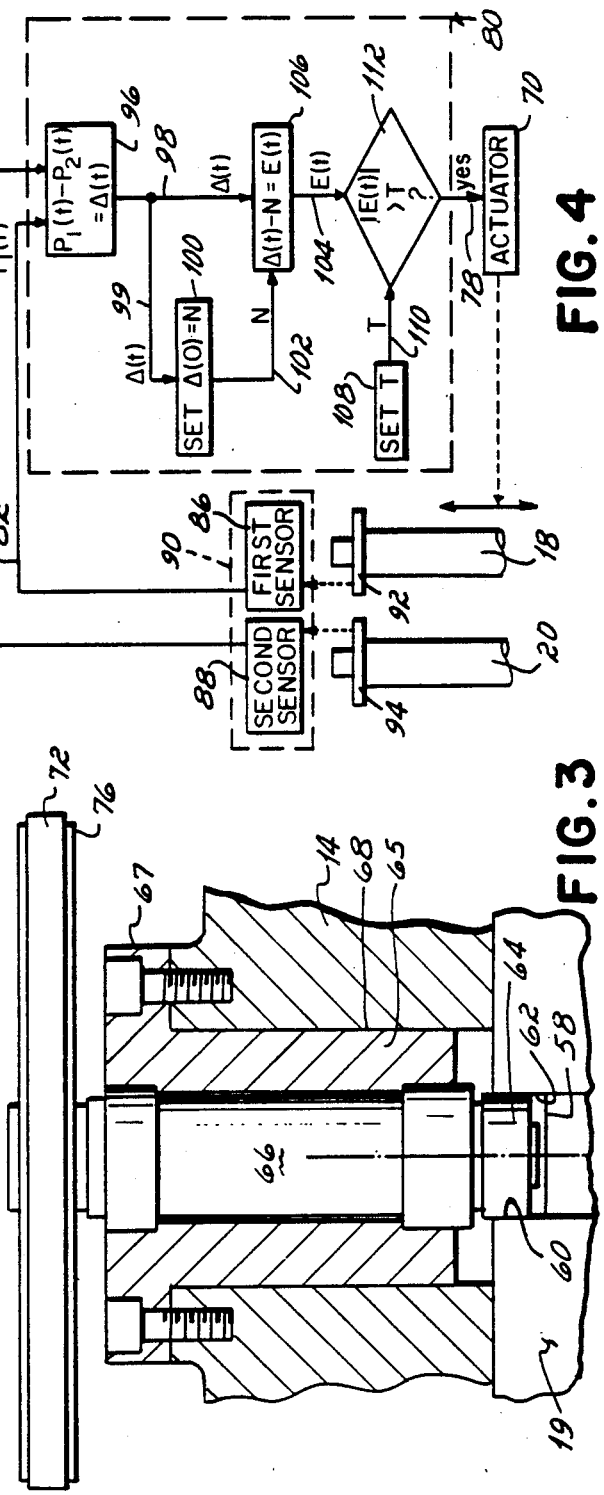

PRECISION SLITTING APPARATUS AND METHOD

FIELD OF THE INVENTION

The present invention relates to slitting machines of the type wherein at least one pair of rotary knives are mounted upon a pair of spaced arbors such that a sheet of material may be slit upon passage between the arbors.

BACKGROUND OF THE DISCLOSURE

In order to form a plurality of strips from a single, relatively wide web of sheet material such as steel, it is common practice to utilize a slitting line. Slitting lines basically consist of an uncoiler from which a web of sheet material is unwound from a coil, a slitting machine which slits the web into a plurality of strips, and a recoiling mechanism which recoils the strips into individual strip coils.

A slitting machine typically includes a pair of arbors which are rotatably supported at each end within a housing. These arbors bear at least one pair of rotary knives, each arbor carrying one mate of each pair. Each rotary knife cooperates with its mate on the opposing arbor to perform the cutting or slitting operation on the web of material as the web is passed between the arbors. The spacing between the arbors is variable so that the rotary knives may be adjusted to be set apart radially or to intermesh to varying degrees. In addition, each rotary knife is positioned upon its arbor to lie in a desired axial relationship with its mate. Once set, this axial relationship must be maintained within a certain tolerance throughout the production run.

The quality of the slit edges produced by a pair of rotary knives is controlled to a great extent by the axial relationship of the mating knives to one another. For slitting applications it is desirable to maintain a nearly constant finite clearance between all pairs of cutters engaged in shearing the master web. As a rule of thumb, for steel sheet, this clearance is usually equal to about ten percent (10%) of the material thickness although for special applications, it may be more or less than this amount. As an example, for a 0.015 inch thick master web, the desired axial relationship might be a clearance of 0.0015 inches. If the clearance becomes too tight, the slit edges might be of acceptable quality but, there is a possibility that mating rotary knives might touch one another. This results in extreme wearing of the cutting edges and subsequent loss of life to the rotary knives. On the other hand, if the clearance becomes too wide, the slit edges produced may have "burrs" or roughness resulting from excessive tearing of the master web. Clearly, both of these conditions are undesirable.

In order to maintain a fixed axial relationship between mating knives, slitting machines built according to the prior art have been designed to attempt to keep both arbors axially fixed so that when rotary knives are mounted upon the arbors, the axial relationship between mating knives will likewise remain fixed. However, in actual practice, arbors can and do shift axially with respect to one another. The consequence of this axial arbor shift is to produce undesirable changes in the axial relationship between mating rotary knives, resulting in excessive knife wear or poor quality, rough edges on the slit strips. Among other factors, this axial shifting may be caused by thermal expansion of one or both arbors due to heat generated by their support bearings, endplay in one or both arbors, or distortion of the base due to variations in the support of the base introduced by the slitting head being moved in and out of the slitting line.

When such a slitting machine is in operation, an inspector must be present to examine the edges of the slit coils for burrs, indicative of a change in the axial relationship of the rotary knives. When such burrs are observed, the slitting line must be shut down while the axial positions of the rotary knives are readjusted on the arbors. This is a difficult, time consuming process. The production down-time involved, the inferior quality slits which may be produced before the problem is remedied and the need for personnel to readjust the knives all impair the productivity of a slitting line.

Accordingly, there is a need for a slitting apparatus and method which provide for restoring mating rotary knives to a desired axial relationship quickly and easily. Furthermore, there is a need for a slitting apparatus and method which provides for monitoring the relative axial positions of the arbors and which responds automatically to reposition the arbors relative to one another as required to maintain each rotary knife in a desired axial relationship with respect to its mate.

SUMMARY OF THE INVENTION

The present invention provides a precision slitting apparatus and method whereby the axial relationship between rotary knives may be restored or continuously maintained as the slitting machine is subjected to perturbing influences such as thermal expansion and mechanical wear. The invention is relatively inexpensive to implement and may be applied to new equipment or readily retrofitted to upgrade existing slitting machines.

According to the invention, each rotary knife is initially set up in a desired axial relationship with respect to its mate. This desired relationship establishes a datum or null point. As the slitting operation commences and the relative positions of the mating rotary knives drift from this null point, the desired axial relationship is restored by adjusting the axial position of at least one of the arbors.

Further according to the invention, the above adjustment is accomplished by mounting a first end of at least one arbor within an axially adjustable sleeve, the opposite end of which is spring biased toward the first end. The sleeve is slideably mounted within a supporting housing and includes an external annular groove which receives a cam to drive the sleeve in either axial direction. The cam may comprise a member of circular cross section having a diameter nearly equal to the width of the groove in the slideable sleeve, the cam being rotatable in each direction about an axis eccentric with respect to its cross section as to effect axial movement of the sleeve and the sleeve supported arbor. Axial backlash is reduced and axial movement of the sleeve supported arbor is accommodated by maintaining one or both arbors in compression with a spring-loaded tailstock, the spring being biased to maintain the arbor in compression against the cam.

Yet further according to the invention, the desired null relationship can be continuously maintained utilizing a feedback control scheme whereby the axial position of each arbor is sensed so that deviations from the selected null point produce an error signal. An actuation means such as a motor responds to a control signal derived from this error signal to rotate the cam in the direction and over the degree of rotation required to restore the relative positions of the arbors to the selected null point.

BRIEF DESCRIPTION OF THE DRAWINGS

FIG. 1 is a side elevation of the preferred embodiment of the precision slitting apparatus of the present invention.

FIG. 3 is a section view taken along line 3—3 in FIG. 2 showing part of the apparatus for adjusting the relative axial positions of the arbors.

FIG. 4 is a flow diagram illustrating the structure and operation of arbor axial position feedback controller portion of the apparatus.

DESCRIPTION OF THE PREFERRED EMBODIMENT

Figure 2:
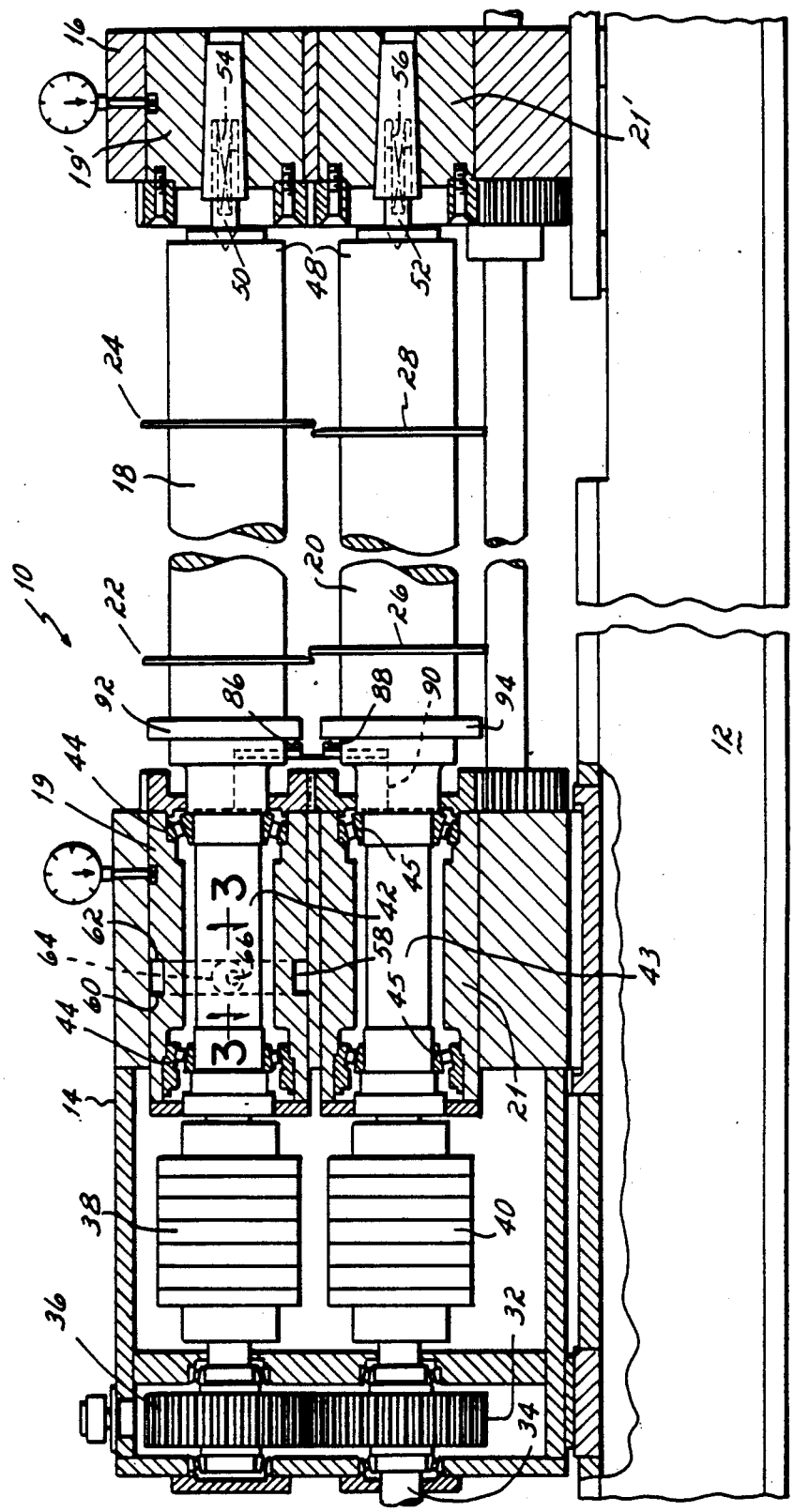
FIG. 2 is an enlarged fragmentary view of a portion of the apparatus shown in FIG. 1.

As shown in FIGS. 1 and 2, the slitting apparatus 10 of the invention includes a base 12 to which is mounted a fixed housing 14. Opposing fixed housing 14 is a moveable housing 16 which is slideably positionable along base 12. An upper arbor 18 and a parallel lower arbor 20 are rotatably supported between the housings 14,16. In the preferred embodiment, the arbors are rotatably supported within eccentric sleeves 19,21,19',21' such that upon rotation of the sleeves 19,21,19',21' by a conventional geared drive 23, the arbors 18,20 are vertically adjusted relative to one another. A conventional geared drive for effecting this adjustment is completely described in my earlier U.S. Pat. No. 4,470,331.

Upper arbor 18 carries one or more rotary knives 22,24 each of which cooperates with a mating rotary knife 26,28 mounted on lower arbor 20. Each rotary knife is disposed in a desired axial relationship with its mate on the opposing arbor. The axial clearance desired is determined by the operator according to the thickness of the master web to be slit and the nature of the cut to be made. Although only two pairs of rotary knives are shown in FIGS. 1 and 2, it should be understood that the invention contemplates a plurality of rotary knives, the number of pairs of knives and the relative spacing among pairs being determined by the desired number and width of strips to be produced from the master web.

Arbors 18 and 20 are powered by drive motor 30 which is connected to a lower drive pinion 32 by a drive shaft 34 through a gear reducer 35. Lower drive pinion 32 engages an upper drive pinion 36. Upper and lower drive pinions 32,36 transmit rotation to the driven ends 42,43 of upper arbor 18 and lower arbor 20 through torque-transmitting couplings 38,40. The driven end 42 of upper arbor 18 is carried by bearings 44 which are mounted within eccentric sleeve 19 and the driving end 43 of lower arbor 20 is carried by bearings 45 which are mounted within eccentric sleeve 21. The undriven ends 48 of upper and lower arbors 18, 20 are rotatably supported by upper and lower tailstocks 50,52 respectively carried by moveable housing 16. Each tailstock is backed up by a compression spring 54,56, which is biased to maintain each arbor 18,20 respectively in compression in order to reduce axial backlash and permit axial adjustment of the upper arbor 18 as explained more fully hereinafter.

Sleeve 19 is slideably mounted for axial movement within fixed housing 14 to permit sleeve 19 to be driven in either axial direction. Bearings 44 engage sleeve 19 and upper arbor 18 so that the upper arbor 18 is axially fixed with respect to sleeve 19. Thus, while upper arbor 18 may rotate freely within sleeve 19, axial motion of sleeve 19 is translated directly to upper arbor 18.

Sleeve 19 includes an external annular groove 58 having opposing sidewalls 60,62. As most clearly seen in FIG. 3, an eccentrically mounted cam 64 is received within groove 58. The cam 64 comprises a roller mounted upon a shaft 66 which is in turn journalled within a sleeve 65. The sleeve 65 is in turn secured by a flange 67 within a bore 68 of the housing 14. Shaft 66 is rotated by an actuator 70 which may comprise any device suitable for bringing about a controlled rotation of shaft 66 including a motor such as a stepping motor or a servo motor. Actuator 70 is connected to shaft 66 by belt 72 and pulleys 74 and 76. Actuator 70 is driven by control signal 78 (FIG. 4) generated by controller 80 in response to a first position signal, $P_1(t)$ and a second position signal, $P_2(t)$ generated by a first sensor 86 and a second sensor 88 respectively. These signals are transmitted via leads 82,84 to a subtractor 96 of the controller 80. Each sensor 86,88 is affixed to a mounting block 90 (FIG. 2) that is affixed to and remains stationary with respect to fixed housing 14.

A first reference ring 92 is affixed to upper arbor 18 opposite first sensor 86 so that a first position signal, $P_1(t)$ is correlated to the axial distance from the first sensor 86 to the first reference ring 92. Likewise, a second reference ring 94 is affixed to lower arbor 20 so that a second position signal, $P_2(t)$ is correlated to the axial distance from the second sensor 88 to the second reference ring 94. Sensors 86,88 may consist of any device, such as an eddy-current probe or a linear variable differential transformer (LVDT) capable of producing an electrical signal correlated to the distance between two points. Eddy-current probes have been found to offer suitable accuracy and are preferred for their lack of moving parts and their ability to sense remotely without a mechanical linkage between the measurement points.

Controller 80 may be either analog or digital. As shown in FIG. 4, controller 80 includes a subtractor 96 which determines the relative axial displacement $\Delta(t)$, of arbors 18 and 20 by subtracting second position signal $P_2(t)$, from, first position signal $P_1(t)$,. Controller 80 also includes initializing means 100 which permits setting the relative axial displacement, $\Delta(t)$ on line 98 equal to a null value N, when the system is initialized at time $t=0$. Null value N, defines a selectable datum or null point, subsequent deviations about which will generate either a positive or negative error signal $E(t)$, when null value N, is subtracted from the relative axial displacement signal $\Delta(t)$, by subtractor 106. As used herein, the term "positive error signal" refers to a signal effective to cause actuator 70 to rotate cam 64 in one direction while the term "negative error signal" refers to a signal effective to cause actuator 70 to rotate cam 64 in the opposite direction. Neither term is intended to imply an electrical polarity. Advantageously, controller 80 also includes tolerance setting means 108 to input a desired, selectable tolerance T, and a comparator 112 for comparing tolerance T, to the magnitude of the error signal $E(t)$, such that a control signal 78 is generated only when the magnitude of the error signal $E(t)$, exceeds the selected tolerance T. This prevents the controller from continuously "hunting" and thereby prolongs the life of the equipment.

The operation of the precision slitting apparatus of the present invention is as follows. Prior to the slitting operation, rotary knives 22,24 are fitted to upper arbor and rotary knives 26,28 are fitted to lower arbor. Mating rotary knives 22,26 and 24,28 are arranged in a desired axial relationship to one another. Sensors 86,88 and controller 80 are then activated. Initializing means 100 is then set so that the desired axial relationship previously established defines a datum or null value N, on line 102. Desired tolerance T is then input on line 110 by way of tolerance setting means 108. If the initial setting of the knives' horizontal positions and subsequent establishment of a datum or null position is done off line, i.e., with the slitter head off of the slitting line proper, the slitting head is then moved into its slitting line position. If any changes in horizontal axial position of one arbor relative to another occurs due to distortion of the supporting base 12, this distortion will be evidenced by an error signal E(t), and the controller will automatically return the arbors to their original axial reference or null point.

At this point, drive motor 30 is activated which drives the gear reducer 35, which in turn rotates the drive shaft 34 and the lower drive pinion 32. Rotation of the lower drive pinion 32 rotates the meshing upper drive pinion 36. Upper and lower drive pinions 32,26 drive upper arbor 18 and lower arbor 20 through torque transmitting couplings 38,40 respectively. Slitting is then commenced by feeding the master web of material to be slit (not shown) between arbors 18 and 20.

First and second sensors 86,88 continue to monitor the distance between each sensor and first reference ring 92 and second reference ring 94 respectively. This information is transmitted to controller 80 in the form of a first position signal $P_1(t)$, via lead 82 and a second position signal $P_2(t)$ via lead 84. Subtractor 96 subtracts second position signal $P_2(t)$, from first position signal $P_1(t)$, to determine the relative axial displacement $\Delta(t)$, between arbors 18 and 20. This displacement signal $\Delta(t)$ is then transmitted via lead 98 to subtractor 106 and via lead 99 to initializing means 100. Subtractor 106 subtracts the null value N, transmitted via lead 102 from the displacement signal $\Delta(t)$, transmitted via lead 98 to yield positive or negative error signal E(t).

As slitting continues, the relative axial positions of arbors 18,20 will often begin to change. For example, viewing FIG. 1, if the upper arbor 18 were to shift to the right due to thermal expansion or end play while the lower arbor 20 remained stationary, the axial clearance designated "A" would decrease, incurring the possibility of damage to rotary knives 22,26, while the axial clearance designated "B" would increase incurring the possibility of tearing the web rather than cutting it, causing a burr to form on the slit edges.

As the relative axial positions of the arbors 18,20 shift away from the null value N, a non-zero error signal E(t) will be generated by subtractor 106 and transmitted via lead 104 to comparator 112. When the magnitude of error signal E(t) exceeds selected tolerance T transmitted to comparator 112 via lead 110, the comparator 112 will generate a control signal on lead 78 which causes actuator 70 to rotate cam 64. As best seen in FIG. 2, rotating shaft 66 counter-clockwise from the illustrated centered position moves the center of roller 64 leftward. Since the spring loaded live center of tailstock 50 maintains the slitter arbor 18 in compression, this leftward movement of the cam 64 results in the sleeve 19 and upper arbor 18 shifting to the left as the side 62 of groove 58 is maintained loaded or pressed against cam 64. Because of the spring loaded compression of the arbor 18, there is never any slop or backlash in the arbor axial adjustment. The leftward movement of the cam 64 restores clearances "A" and "B" of FIG. 1 to the values present before upper arbor 18 was shifted to the right as was previously postulated. Conversely, clockwise rotation of shaft 66 from the illustrated centered position would move the center of cam 64 to the right if a correction in that direction was required. Regardless of how their relative axial positions are perturbed, the magnitude and algebraic sign of control signal 78 are proper to rotate cam 64 in the direction and over the required degree of rotation necessary to restore the relative axial positions of arbors 18,20 to the datum point, thereby maintaining each rotary knife in a desired axial relationship with its mate.

While the apparatus and method herein described constitutes a preferred embodiment of this invention, it is to be understood that the invention is not limited to this precise form of apparatus and that changes may be made therein without departing from the scope of the invention. Therefore I do not intend to be limited except by the scope of the following appended claims.

What is claimed is:

1. A slitting apparatus for forming a plurality of relatively narrow strips from a single, relatively wide web of material comprising,
    a pair of rotatable, spaced, parallel arbors,
    at least one pair of rotary knives mounted upon said arbors, each arbor carrying one mate of each pair of said rotary knives, and
    means for adjusting the relative axial position of one of said arbors with respect to the other to maintain each of said rotary knives in a desired axial relationship with its mate on the other arbor, said means for adjusting the relative axial position of said one arbor being an automatic means, said automatic means being responsive to misalignment of said arbors to effect axial repositioning of said rotary knives.

2. The apparatus of claim 1 wherein said automatic means includes means for sensing the relative axial positions of said arbors,
    means for generating an error signal indicative of the direction and magnitude of any displacement of the relative axial positions about a selectable null point,
    actuation means responsive to said error signal for moving said one arbor as required to restore the relative axial positions of said arbors at said selectable null point.

3. The apparatus of claim 2 wherein said means for sensing the relative axial positions of said arbors includes
    a first reference ring attached to said one arbor and
    a second reference ring attached to said other arbor
    a first sensor and
    a second sensor, each of said sensors being located as to respond to the axial position of each of said reference rings with a first position signal and a second position signal respectively, each of said position signals being correlated to the axial distance from each of said sensors to each corresponding reference ring.

4. The apparatus of claim 3 wherein said first and second sensors are eddy-current probes.

5. The apparatus of claim 2 wherein means for generating an error signal includes
    means for subtracting one of said position signals from the other and setting the difference so obtained equal to a null value as to establish a selectable null point, deviations about which will appear as either a positive or negative error signal.

6. The apparatus of claim 2 wherein said actuation means includes a motor.

7. The apparatus of claim 6 wherein said motor is a stepper motor.

8. The apparatus of claim 7 wherein said motor is a servo motor.

9. The apparatus of claim 1 further including means for eliminating axial backlash in said adjusting means.

10. The apparatus of claim 8 wherein said adjusting means is mounted upon one end of said one arbor and said means for eliminating axial backlash includes
a tailstock for rotatably supporting the other end of said one arbor, and
spring means to axially load said tailstock.

11. The apparatus of claim 10 wherein said spring means is biased to maintain said one arbor in compression.

12. A slitting apparatus for forming a plurality of relatively narrow strips from a single, relatively wide web of material comprising,
a pair of spaced, rotatable, parallel arbors comprising a first arbor and a second arbor,
a housing for supporting said arbors,
at least one set of rotary knives mounted upon said arbors in pairs, each arbor carrying one mate of each of said pair,
a sleeve, slideably mounted within said housing, one end of said first arbor being rotatably mounted and axially fixed inside said sleeve, said sleeve having an external annular groove with opposing sides,
a bi-directionally rotatable cam received within said groove, so that rotation of said cam in one direction causes said first arbor to move in one axial direction and rotation of said cam in the other direction causes said first arbor to move in the other axial direction, and
means for rotating said cam to maintain each of said rotary knives in a desired axial relationship with its mate on the other arbor.

13. The apparatus of claim 12 wherein said cam comprises a member of circular cross section in the area where said member is received within said groove, said member being rotatable about an axis eccentric with respect to said circular cross section.

14. The apparatus of claim 13 wherein the diameter of said circular cross section is so nearly equal to the width of said groove as to substantially prevent axial movement of said sleeve except for such axial movement as may be caused by rotation of said cam.

15. The apparatus of claim 13 wherein said means for rotating said cam to maintain each of said rotary knives in a desired axial relationship with its mate on the other arbor is an automatic means, said automatic means being responsive to misalignment of said arbors to effect axial repositioning of said rotary knives.

16. The apparatus of claim 15 wherein said automatic means includes means for sensing the relative axial positions of said arbors,
means for generating an error signal indicative of the direction and magnitude of any displacement of said relative axial positions of said arbors about a selectable null point, and
actuation means responsive to said error signal for rotating said shaft in the proper direction over the degree of rotation required to restore the relative axial positions of said arbors to said selectable null point.

17. The apparatus of claim 16 wherein means for sensing the relative axial positions of said arbors includes
a first reference ring attached to said first arbor and
a second reference ring attached to said second arbor
a first sensor and
a second sensor, each of said sensors being located as to respond to the axial position of each of said reference rings with a first position signal and a second position signal respectively, each of said position signals being correlated to the axial distance from each of said sensors to each corresponding reference ring.

18. The apparatus of claim 17 wherein said first and second sensors are eddy-current probes.

19. The apparatus of claim 18 further including
a mounting block common to both of said sensors for the purpose of improving the accuracy of said error signal by preventing said first sensor and said second sensor from moving relative to one another.

20. The apparatus of claim 17 wherein means for generating an error signal includes
means for subtracting one of said position signals from the other and setting the difference so obtained equal to a null value as to establish a selectable null point, deviations about which will appear as either a positive or negative error signal.

21. The apparatus of claim 17 wherein said actuation means includes a motor.

22. The apparatus of claim 21 wherein said motor is a stepper motor.

23. The apparatus of claim 21 wherein said motor is a servo motor.

24. The apparatus of claim 13 further including means for reducing axial backlash in said first arbor.

25. The apparatus of claim 24 wherein said means for reducing axial backlash includes
a tailstock for rotatably supporting the other end of said first arbor and,
a spring to axially load said tailstock.

26. The apparatus of claim 25 wherein said spring is biased to maintain said first arbor in compression.

27. A method for forming a plurality of relatively narrow strips from a single, relatively wide web of material comprising the steps of
arranging at least one pair of rotary knives upon a pair of spaced, parallel arbors so that each arbor carries one mate of each of said pairs of rotary knives,
aligning each of said rotary knives in a desired axial relationship with respect to its mate,
automatically maintaining said axial alignment of said rotary knives within predetermined tolerances during passage of said web between said rotary knives by adjusting the axial position of said arbors relative to one another in response to misalignment of said knives beyond said predetermined tolerances.

28. The method as claimed in claim 27 further including the step of maintaining at least one of said arbors in compression to reduce axial backlash.

29. A method of forming a plurality of relatively narrow strips from a single, relatively wide web of material comprising the steps of
arranging at least one pair of rotary knives upon a pair of spaced, parallel arbors so that each arbor carries one mate of each of said pairs of rotary knives, aligning each of said rotary knives in a desired axial relationship with respect to its mate, sensing the axial positions of said arbors relative to one another, selecting said desired axial relationship of said knives as a null point, generating an error signal in response to the sensed axial position of said arbors relative to one another, said error signal being indicative of the magnitude and direction of any displacement of the relative position of said arbors about said null point, adjusting the axial position of sone of said arbors relative to the other in response to said error signal to maintain said rotary knives in said desired axial relationship.

30. The method as claimed in claim 29 further including the step of maintaining at least one of said arbors in compression to reduce axial backlash.

* * * * *

UNITED STATES PATENT AND TRADEMARK OFFICE
CERTIFICATE OF CORRECTION

PATENT NO. : 4,667,550

DATED : May 26, 1987

INVENTOR(S) : John C. Eiting

It is certified that error appears in the above-identified patent and that said Letters Patent is hereby corrected as shown below:

Column 10, line 3, change "sone" to --one--.

Signed and Sealed this

First Day of March, 1988

Attest:

DONALD J. QUIGG

*Attesting Officer*   *Commissioner of Patents and Trademarks*